June 15, 1926.
L. A. ZOHE
1,588,929
APPARATUS FOR DEHYDRATING LIQUIDS
Filed Feb. 28, 1921
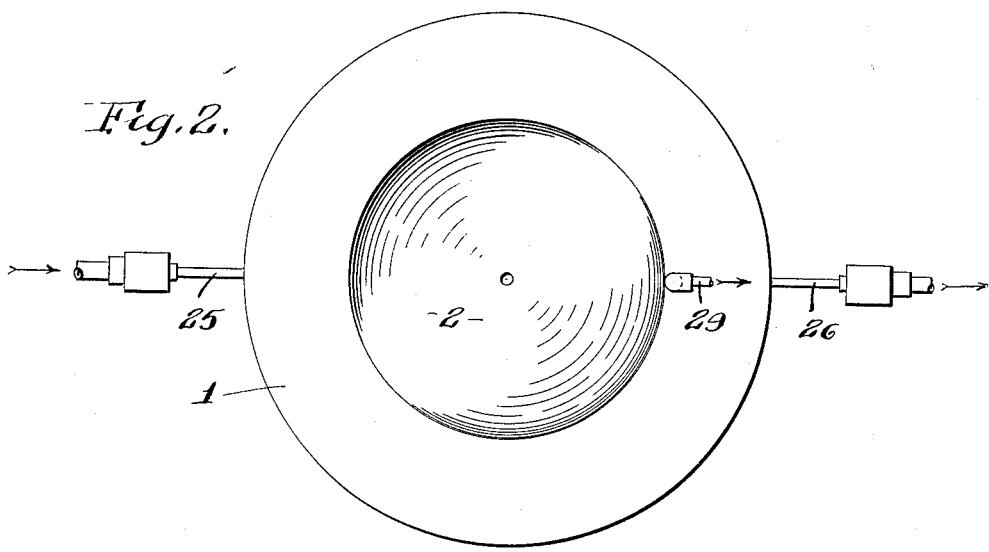
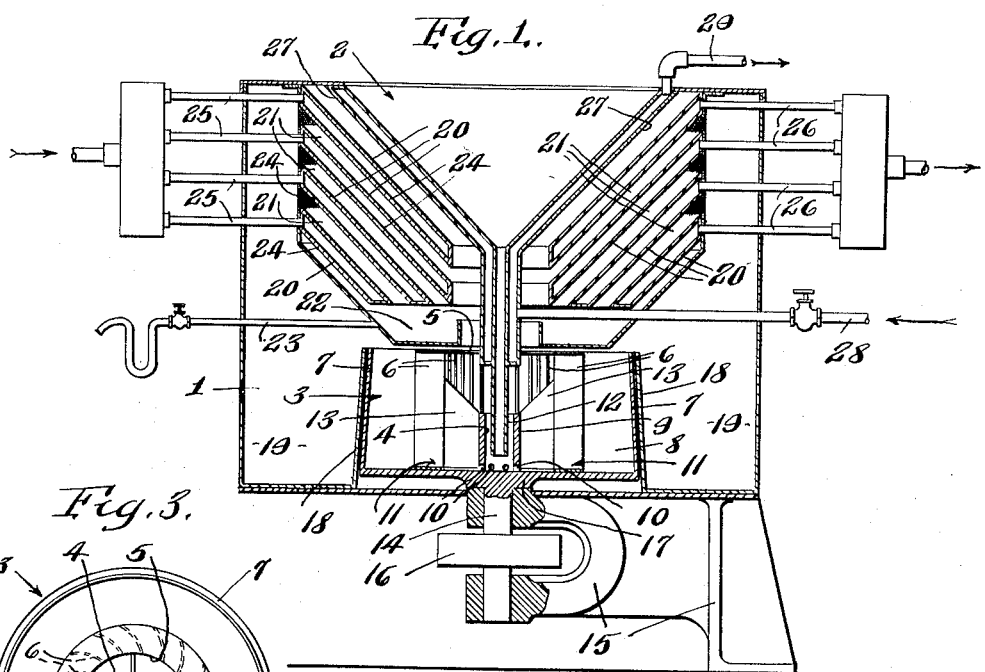
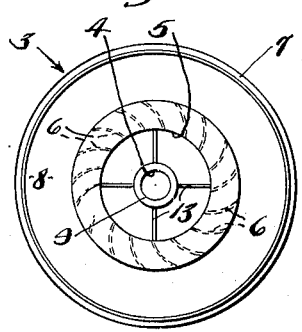
Ludwig Alvine Zohe INVENTOR.
BY Parsons & Bodell ATTORNEYS.

Patented June 15, 1926.

1,588,929

UNITED STATES PATENT OFFICE.

LUDWIG ALVINE ZOHE, OF SYRACUSE, NEW YORK.

APPARATUS FOR DEHYDRATING LIQUIDS.

Application filed February 28, 1921. Serial No. 448,558.

This invention has for its object a machine for dehydrating liquids which is particularly simple and compact in construction, economical to install and highly efficient and durable in use.

The invention consists in the novel features and in the combinations and constructions hereinafter set forth and claimed.

In describing this invention, reference is had to the accompanying drawings, in which like characters designate corresponding parts in all the views.

Figure 1 is a vertical sectional view of this machine.

Figure 2 is a plan view thereof.

Figure 3 is a plan view of the centrifugal means.

This machine operates to carry out a process of dehydrating liquids consisting in forming the liquid in a film on a surface in a current of gas, the chemical action of which, if any, is not objectionable, or a gas as carbon dioxide ($CO_2$) which is practically inactive on the liquid film, and acts in accordance with the well known law of saturation.

The film is preferably formed by throwing the liquid centrifugally on a rotating annular surface or wall up which it is fed by the centrifugal action of such rotating surface, and the gas is thrown in contact with the film on the wall by a centrifugal fan rotatable with and located within said wall.

The gas in case the liquid is milk, is preferably carbon dioxide ($CO_2$) which also retards the bacteria in liquids as milk.

This machine comprises a closed casing or chamber 1, here shown as cylindrical in form, and having a central funnel-shaped inlet 2 for the liquid, a centrifugal member 3 arranged in the bottom of the chamber concentric therewith and having a central inlet 4 arranged to receive the liquid from the funnel, also an inlet 5 for the gas concentric with the axis of the inlet 4, and a condenser for removing the water from the gas, the condenser discharging in the inlet 5 of the fan.

The centrifugal apparatus 3 is here illustrated as in the form of a rotatable pan or bowl located adjacent the bottom of the chamber 1, and having an annular series of fan blades 6 between the annular wall 7 thereof and the axis of the bowl providing an annular space 8 and a central hollow hub 9 which constitutes the inlet 4 for the liquid, the hub being formed with radial outlets 10 near the bottom of the pan. The stem 12 of the funnel extends into the hub. Blades 13 which support the annular series of blades 6 are connected at their inner ends to the hub. The annular wall 7 is slightly conical that is, it tapers toward its top edge.

The centrifugal apparatus is mounted on a shaft 14 extending through the bottom of the chamber or casing 1 and journaled in bearings provided in a bracket 15. A suitable wheel or a pulley 16 is mounted on the shaft to connect it to a motor. The bottom of the bowl of the separator has an outer hub 17 which thrusts against a bearing face on the bracket 15. Preferably, an annular wall 18 surrounds the bowl and forms a pocket 19 into which the dehydrated product falls.

The condenser here illustrated, comprises a series of conical plates 20 located in the chamber 1, one above the other, concentric with the axis of the funnel 2 and converging toward such axis, and being spaced apart to form passages 21 for the moisture laden gas, these passages 21 opening at their inner ends into a space around the stem 12 of the funnel 2, and opening at the outer ends into the upper part of the casing or chamber 1. A drip pan 22 to receive the condensation from the gas arranged below the plates, the pan having a suitable outlet 23.

The plates 20 are preferably provided with jackets 24 for receiving a cooling medium, as water, which jackets may be connected to suitable inlet and outlet pipes 25, 26.

The funnel 2 is suitably supported in the top of the casing and is formed with a jacket 27 to receive a heating medium, as steam, to heat the liquid and cause it to give up the water content more readily. The jacket of the funnel is provided with suitable inlet and outlet pipes 28, 29.

In operation, the liquid, as for instance, milk, is passed into the centrifugal apparatus 3 through the funnel 2 its stem 12 and inlet 4 and is thrown through the radial outlets 10 along the bottom of the fan against the annular wall 7 and up such wall in the form of a film, thence sprayed off the upper edge of the wall. The action of the fan blades 6 draws the gas into the pan through the inlet 5 of the fan and throws it against the film of milk on the wall 7. The fan circulates the gas so that it passes downwardly through the condenser to the entrance 5 of the fan. The dehydrated product deposits in the pocket 19. With some liquids it is desirable to feed the liquid also into the inlet 5 with the gas so that it mixes with the gas when passing through the fan.

This machine is particularly advantageous in that owing to its simplicity of operation and the cheapness of the gas and to the fact that the gas is not lost except by leakage, it can be installed and operated on dairy farms, so that milk can be sterilized, dehydrated and kept on the farm and shipped when convenient, as it is not necessary to rush the milk to the market or creamery, or milk station.

This process and apparatus are equally adapted to dehydrate other liquids, as in the manufacture of dyes. By liquids, is meant any fluids having solid matter therein, as syrups, fluid, pulpy matter, etc.

In some cases as when the liquids are pulpy as for instance dye stuffs, the liquid is delivered into the inlet 5 of the fan with the gas, and thrown against the annular wall of the bowl which in this case is perforated or formed of wire screening so that the water is carried by the centrifugal action through the annular wall or screen into the space between the wall 18 and the bowl and the dehydrated pulp thrown over the edge of said annular wall into the pocket 19.

What I claim is:

1. A dehydrating machine comprising a closed chamber for receiving a moisture absorbing gas, a fan in the chamber having an inlet for the liquid to be dehydrated, and for the gas, and arranged so that the liquid and the gas are thrown centrifugally therefrom, and a wall surrounding the fan and rotatable about the axis of the fan, and arranged in the path of the liquid and the gas thrown by the fan, whereby the liquid forms a film on the wall.

2. A dehydrating machine comprising a closed chamber for receiving a moisture absorbing gas, centrifugal means comprising a rotating bowl opening into the chamber and having an annular wall, and a centrifugal fan in the bowl and rotatable therewith and having the edges of its blades spaced apart from the annular wall of the bowl, the basket having an axial inlet for the liquid to be dehydrated and for the gas.

3. A dehydrating machine comprising a closed chamber for receiving a moisture absorbing gas, centrifugal means comprising a rotating bowl opening into the chamber and having an annular wall, and a centrifugal fan in the bowl and rotatable therewith and having the edges of its blades spaced apart from the annular wall of the bowl, a central inlet for the liquid to be dehydrated opening into the bowl near the bottom thereof, and an inlet for the gas around the liquid inlet.

4. A dehydrating machine, comprising a closed chamber for receiving a moisture absorbing gas, centrifugal means comprising a rotatable bowl opening into the chamber, and having an annular wall, and a centrifugal fan in the bowl and rotatable therewith, and having the edges of its blades spaced apart from the annular wall of the bowl, an axial inlet for the liquid to be dehydrated opening into the bowl, and a condenser comprising plates arranged to form passages for the gas and arranged in the chamber above the fan and concentric therewith, and a pan within the chamber for receiving the drip from the condenser, said passages opening at their outer ends into the chamber, and communicating at their inner ends with the centrifugal fan.

In testimony whereof, I have hereunto signed my name, at Syracuse, in the county of Onondaga, and State of New York, this 29th day of January, 1921.

LUDWIG ALVINE ZOHE.